Dec. 18, 1962  W. ANGELE ETAL  3,069,123
INSTRUMENT SUPPORT WITH PRECISE LATERAL ADJUSTMENT
Filed Oct. 12, 1961

WILHELM ANGELE
DONELSON B. HORTON
INVENTORS

BY

ATTORNEYS

United States Patent Office 3,069,123
Patented Dec. 18, 1962

3,069,123
INSTRUMENT SUPPORT WITH PRECISE
LATERAL ADJUSTMENT
Wilhelm Angele, Huntsville, and Donelson B. Horton, Madison, Ala., assignors to the United States of America as represented by the Administrator of the National Aeronautics and Space Administration
Filed Oct. 12, 1961, Ser. No. 144,804
8 Claims. (Cl. 248—346)
(Granted under Title 35, U.S. Code (1952), sec. 266)

The invention described herein may be manufactured and used by or for the Government of the United States of America for governmental purposes without the payment of any royalties thereon or therefor.

This invention relates generally to a device for making extremely fine adjustments.

More specifically, the invention provides a device which is attachable to a roundness measuring or gauging means and which can be adjusted within millionths of an inch, yet one which is simple of operation and manufacture.

It has long been a problem, particularly in determining and/or measuring roundness of an object, such as by an "Indiron," "Talyrond," or like device, to exactly center the measuring instrument. The prior art has attempted to solve this problem by the provision of "vernier" type adjustments. However, such adjusting devices have not proved entirely satisfactory, both because such devices are not practically capable of the ultrasmall movements required, and because the mechanical movements employed are subject to looseness and backlash, thus making the achievement of the small movements required impractical. Prior art devices were, in addition, difficult to manufacture with the precision requisite for such small movements, and difficult to maintain or service, thereby adding materially to their initial and operating costs.

It is the general object of the present invention to provide a centering device adjustable to one-millionth of an inch and smaller.

It is an additional object of the invention to provide a fine adjustment device which is rugged, simple of operation, free of looseness, and easy to operate and maintain.

It is a more specific object to provide a fine adjustment device for incorporation with a roundness measuring apparatus.

The above, and other objects, are achieved in the device of this invention by providing a plate or body element and a mechanical means, which means has a known elasticity, in operative relationship with the body to impart thereto a desired deflection. By the arrangement of the deflection imparting means in relation to the body, an ultrasmall, finite movement can be caused in the center of the body element. The present invention thus obviates the prior art shortcomings in a highly efficient and simplified manner, thus greatly reducing manufacturing time and costs, maintenance and operational difficulty.

Referring now to the drawings wherein like reference numerals designate like parts:

Figure 1:
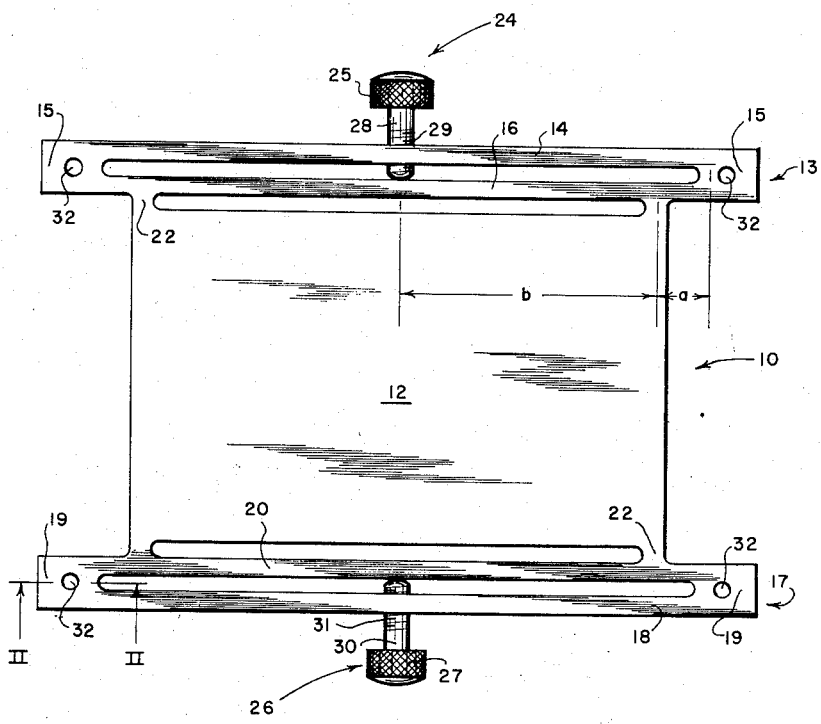
FIGURE 1 is a plan view of the present preferred embodiment of the invention.

With particular reference now to FIGURE 1, 10 indicates the device of the invention in general. This device comprises a metal plate or body portion 12 having a substantial thickness. The preferred form employs a steel plate of one inch thickness, although it is obvious other materials and/or dimensions may be used. Pairs of beams having known elasticity, here designated for ease of understanding with reference to the drawing as upper (14, 16) and lower (18, 20) beams, are positioned on opposite longitudinal sides of the body portion 12 and make up the deflection imparting or transferring means 13 and 17, respectively. The beams of each pair of beams are linked together at the ends. Thus, upper beam 14 has link members 15 connecting it with upper beam 16, while lower beam 18 is connected by links 19 with lower beam 20.

Figure 2:
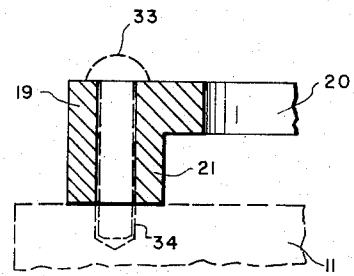
FIGURE 2 is an elevational view, partially in section, of a portion of the device taken on the line II—II of FIGURE 1.

The beam links 15, 19 serve also as feet 21, as best seen in FIGURE 2, so that the deflection imparting means 13, 17 and the body portion 12 are free of the base 11 to eliminate frictional resistance. The pairs of beams or deflection imparting means 13, 17 are connected to the body portion 12 by necks 22, these necks being spaced inwardly from the ends of the beams a predetermined distance so that the lever arm ratio $a/b$, as seen in FIGURE 1, has a definite and predetermined relationship. The upper and lower deflection imparting means 13, 17 are each provided with deflection inducing means 24, 26 respectively. This deflection inducing means is here shown to comprise screws having knurled heads 25, 27 and shafts 28, 30 respectively. The shafts are provided with threads 29, 31, which threads may have different screw pitches for a purpose to be explained below.

All elements, i.e. the body 12, deflection imparting means 13, 17, and deflection inducing means 24, 26, are symmetrical to one axis, the only exception being the screw pitch 29, 31. The outer ends of the deflection imparting means 13, 17 are provided with apertures 32, most conveniently through the links 15, 19 as shown and described above, through which dowel pins 33 secure the fine adjustment device 10 to a suitable base 11, the base 11 having base pin recesses 34 therein, as best seen in FIGURE 2. Although FIGURE 2 shows only the link 19 for deflection imparting means 17, it is obvious that links 15 of deflection imparting means 13 are identical thereto. It is, of course, necessary that these pins 33 have a snug fit with both the apertures 32 and base pin recess 34 to prevent any play therebetween.

Since most adjustments are desired in two axes, the second adjustment may best be accomplished by a means identical to that described above, positioned immediately thereunder and rotated 90°. Since such means is a duplicate of the above described device, it has not been illustrated.

The operation of the adjustment device is simple and quickly accomplished. By way of example, for the specific embodiment described above, and assuming a screw pitch (29) of 50 threads per inch for screw 24, one complete turn, i.e. 360°, of screw 24 would cause beams 14, 16 to separate $\frac{1}{50}$ inch or 0.020 inch. Substantially one-half of this separation, or 0.010 inch, goes to each beam 14, 16. Since beam 16 is connected by necks 22 to body portion 12, 0.010 inch movement goes toward the center of body portion 12, and is further reduced by the ratio $a/b$. Assuming a ratio of 1:20 (now used on the devices in operation for simplicity, but obviously subject to change without departing from the scope of the inventive concept), the movement would be $\frac{1}{20}$ of 0.010 inch, or 0.0005 inch. However, this would hold true only if the opposite side of the plate were free, and since it is fixed by pins 33 through apertures 32 in links 19 and pin recess 34 in base 11, this movement meets the resistance of elastic beams 18, 20 and is therefore further reduced by a factor of 2. Thus, one complete turn of the screw 24 causes a deflection in the center of plate 12 of 0.00025 inch.

By turning screw 24 only 1½° or about $\frac{1}{250}$ of a turn, the final motion of plate 12 will be 0.000001 inch, or one-millionth of an inch. But, as noted, screw pitches 29 and 31 may be different, so assuming screw 24 to be 50 threads per inch, and screw 26 to be 45 or 55 threads per inch, this movement could be again refined by a factor of 10 by rotating both screws 24, 26 the same amount and against each other, thereby achieving an adjustment of tenths of a millionth of an inch. It is of course realized that a portion of this motion is reduced by elastic deformation of the screw contact area against the beams and the elasticity of the screw threads, however, such reduction is of negligible import in the fine adjustments obtainable.

Thus, there has been described an ultra-precision adjusting means which, with the exception of the screws, has no loose parts and is therefore not subject to looseness or backlash, the adjustment being made solely through the elasticity of the beams or deflection imparting means. The fineness of the adjustment is dependent on the lever arm ratio of the beams and their elasticities and the screw pitches of the deflection inducing means. Such construction is simple to manufacture, rugged, easy to operate, and highly sensitive, permitting adjustments of a fineness which were not previously capable of achievement. Naturally, many changes may be made in the device, such as screw pitch, beam lever arm ratio, or other mechanical modifications without departing from the scope of the invention as disclosed and claimed.

What is claimed is:

1. An apparatus for adjusting a precision measuring means having a base finite distance along a given axis comprising;
   (A) a central body portion movably mounted on said base,
   (B) pairs of flexible beams adjacent to but spaced from said body portion on two opposed sides thereof,
      (1) the beams of each said pair of beams spaced from one another and operatively interconnected at the ends thereof by rigid connecting links,
      (2) said links linearly immovably secured to said base to thereby restrain the ends of said links and said beams,
      (3) said links forming feet serving to space said body portion and said beams from said base,
   (C) rigid conecting means between each said pair of beams and said body portion,
      (1) said last named connecting means comprising integral necks in inwardly spaced, predetermined relation to said beam connecting links.
   (D) a threaded, rotatably mounted, rotation translation means operatively associated with each of said pair of beams serving to deflect each beam of each said pair of beams in opposite directions in an established ratio to the linear movement of said rotation translation means,
      (1) said rotation translation means each comprising a screw having threads of a given pitch thereon,
      (2) said thread pitches each differing from the other and operative to impart a differential stress to said body portion and thus cause therein a finite, ultrasmall linear movement.

2. An apparatus for obtaining a precise adjustment along at least one axis, said apparatus comprising:
   (A) a body means movable in one plane, and
   (B) means serving to impart a deflection of predetermined magnitude thereto, said deflection imparting means including
      (1) a flexible beam operatively connected to said body means
         (a) said beam having free ends relative to said body means but fixed relative to a base and
         (b) said operative connection comprises a pair of necks rigidly connected to said body means;
         (c) said necks spaced inwardly from the beam ends a predetermined distance to thereby establish a beam-lever arm ratio.

3. The apparatus as defined by claim 2 wherein said deflection imparting means includes
   (A) a stress inducing means operative to deflect said beam,
   (B) said stress inducing means comprising a rotatable shaft having
      (1) means integral therewith responsive to rotation to thereby advance or retract said shaft in a linear direction,
      (2) reaction means integral with said shaft on one end thereof operative to transmit said linear movement and
      (3) a rotation imparting means integral with said shaft on the other end thereof.

4. An apparatus adjustable a finite distance along at least one axis, said apparatus comprising;
   (A) a body means movable in one plane, and
   (B) means serving to impart a deflection of ultrasmall magnitude thereto, said deflection imparting means comprising
      (1) at least one pair of spaced flexible beams rigidly interconnected at the ends thereof,
      (2) said beams connected to said body means at a point spaced inwardly of the ends thereof,
      (3) stress inducing means serving to impart a given deflection to said body means through stressing said spaced flexible beams, said stress inducing means comprising
         (a) a threaded screw having cooperative means for transmitting a stress of known magnitude to said deflection imparting means in a given ratio to a rotational movement of said stress inducing means, said deflection imparting means actuating said body means to deflect a known distance in a ratio determined by the interconnection of said spaced flexible beams to one another and to said body means.

5. An apparatus for adjusting a precision measuring means a finite distance along at least one axis, said apparatus comprising;
   (A) a body means restrained on the precision measuring means and movable along one plane,
   (B) means serving to impart a deflection of the order of one-millionth of an inch thereto, said means comprising
      (1) a pair of flexible beams on opposed sides of said body means,
      (2) said beams being spaced from said body means by rigid, integral connecting members spaced inwardly of the ends of said beams
      (3) each of said beams having a deflection inducing means operatively connected thereto,
      (4) said deflection inducing means acting in opposite directions to one another to thus differentially deflect said body means.

6. An apparatus for precise adjustment along one axis, said apparatus comprising;
   (A) a central body means,
   (B) a deflection imparting means having a known elasticity and comprising at least one flexible beam secured to said body means in at least two places by rigid connecting members laterally spaced from one another along said beam and serving to transmit a portion of a deflection induced therein to said central body means, and
   (C) deflection inducing means operatively associated with said deflection imparting means and said body means and serving to induce the deflecting stress therein.

7. An apparatus for precise adjustment along one axis, said apparatus including;
   (A) a plate member having substantial thickness
   (B) a first flexible member having a longitudinal slot centrally positioned therein, (1) said flexible member being elastically deformable at the central portion thereof in opposite directions on each side of said slot,
(2) said flexible member having cooperative means for imparting a portion of a deflection therein to said plate member,
(C) and stress inducing means operable to deflect said flexible member a predetermined finite distance on the application of a predetermined stress.

8. An instrument support with precise lateral adjustment comprising;
(A) a plate-like body portion to be moved in a predetermined direction along one axis,
(B) at least one flexible reaction element rigidly secured to said plate-like body portion in a plurality of spaced locations along said reaction element and operatively associated with and positioned adjacent said body portion, deflection of said reaction element serving to transmit a temporarily deforming deflecting stress to said plate-like body portion through said rigidly secured locations,
(C) reaction element deflecting means serving to stress said reaction element and consequently said body portion to thereby induce an ultrasmall, finite deflection to said body portion.

References Cited in the file of this patent

UNITED STATES PATENTS 2,909,351   Pratt _____ Oct. 20, 1959